(12) United States Patent
Chou et al.

(10) Patent No.: US 8,427,927 B1
(45) Date of Patent: Apr. 23, 2013

(54) THERMALLY-ASSISTED MAGNETIC RECORDING HEAD, HEAD GIMBALS ASSEMBLY, HEAD ARM ASSEMBLY, AND MAGNETIC DISK UNIT

(75) Inventors: Tsutomu Chou, Tokyo (JP); Koji Shimazawa, Tokyo (JP); Shinji Hara, Tokyo (JP); Eiji Komura, Tokyo (JP); Ryo Hosoi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/370,982

(22) Filed: Feb. 10, 2012

(51) Int. Cl.
*G11B 11/00* (2006.01)

(52) U.S. Cl.
USPC ............... 369/112.27; 369/13.13; 360/125.31

(58) Field of Classification Search ............... 369/13.33, 369/13.32, 13.24, 13.14, 13.03, 13.02, 13.12, 369/13.13, 13.01, 13.35, 13.37, 112.27, 112.09, 369/44.12; 360/59, 125.31, 125.74, 125.75; 385/37, 43
See application file for complete search history.

(56) References Cited

U.S. PATENT DOCUMENTS

| 6,649,894 | B2 | 11/2003 | Matsumoto et al. |
| 6,768,556 | B1 | 7/2004 | Matsumoto et al. |
| 7,330,404 | B2 | 2/2008 | Peng et al. |
| 8,270,791 | B2 * | 9/2012 | Komura et al. ............ 385/37 |
| 2012/0082016 | A1 * | 4/2012 | Komura et al. ......... 369/13.33 |

FOREIGN PATENT DOCUMENTS

| JP | A-2001-255254 | 9/2001 |
| JP | B2-4032689 | 11/2007 |

* cited by examiner

*Primary Examiner* — Ali Neyzari
(74) *Attorney, Agent, or Firm* — Oliff & Berridge, PLC

(57) ABSTRACT

The thermally-assisted magnetic recording head includes: a magnetic pole; a waveguide allowing a transverse-electric (TE) wave oscillating in a cross-track direction to propagate toward an air bearing surface; and a plasmon generator having a tip portion near the air bearing surface, the tip portion being provided to overlap, in a down-track direction, with both the magnetic pole and the waveguide, and having a quadrangular cross-section substantially parallel to the air bearing surface.

14 Claims, 16 Drawing Sheets

THERMALLY-ASSISTED MAGNETIC RECORDING HEAD, HEAD GIMBALS ASSEMBLY, HEAD ARM ASSEMBLY, AND MAGNETIC DISK UNIT

BACKGROUND OF THE INVENTION

1. Field of the Invention

The present invention relates to a thermally-assisted magnetic recording head used in a thermally-assisted magnetic recording in which near-field light is applied to a magnetic recording medium to lower a coercivity thereof so as to record information, and a head gimbals assembly, a head arm assembly, and a magnetic disk unit which are provided with the thermally-assisted magnetic recording head.

2. Description of Related Art

A magnetic disk unit in the related art is used for writing and reading magnetic information (hereinafter, simply referred to as information). The magnetic disk unit is provided with, in the housing thereof, a magnetic disk in which information is stored, and a magnetic read write head which records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and the magnetic read write head includes a magnetic write element and a magnetic read element which have an air bearing surface (ABS) facing the magnetic disk. In particular, as the magnetic read element, a magneto-resistive (MR) element exhibiting magneto-resistive effect is generally used. The other end of the suspension is attached to an end of an arm which is rotatably supported by a fixed shaft installed upright in the housing.

When the magnetic disk unit is not operated, namely, when the magnetic disk does not rotate, the magnetic read write head is not located over the magnetic disk and is pulled off to the position away from the magnetic disk (unload state). When the magnetic disk unit is driven and the magnetic disk starts to rotate, the magnetic read write head is changed to a state where the magnetic read write head is located at a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure. Thus, the information is accurately recorded and reproduced.

In recent years, with a progress in higher recording density (higher capacity) of the magnetic disk, an improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured by a plurality of magnetic microparticles. Since the roughness of a boundary between adjacent recording bits is necessary to be small in order to increase the recording density, the magnetic microparticles need to be made small. However, if the magnetic microparticles are small in size, thermal stability of the magnetization of the magnetic microparticles is lowered with decreasing the volume of the magnetic microparticles. To solve the difficulty, increasing magnetic anisotropy energy of the magnetic microparticle is effective. However, increasing the magnetic anisotropy energy of the magnetic microparticle leads to increase in the coercivity of the magnetic disk. As a result, difficulty occurs in the information recording using the existing magnetic head.

As a method to solve the above-described difficulty, a so-called thermally-assisted magnetic recording has been proposed. In the method, a magnetic recording medium with large coercivity is used, and when information is written, heat is applied together with the magnetic field to a portion of the magnetic recording medium where the information is recorded to increase the temperature and to lower the coercivity, thereby recording the information. Hereinafter, the magnetic head used in the thermally-assisted magnetic recording is referred to as a thermally-assisted magnetic recording head.

In the thermally-assisted magnetic recording, near-field light is generally used for applying heat to a magnetic recording medium. For example, in Japanese Unexamined Patent Application Publication No. 2001-255254 and in Japanese Patent No. 4032689, disclosed is a technology of allowing frequency of light to coincide with a resonant frequency of plasmons which are generated in a metal, by directly applying light to a plasmon generator, in order to generate near-field light. In the method of directly applying light to a plasmon generator, however, the plasmon generator itself overheats and accordingly deforms, depending on usage environment or conditions. Therefore, practical realization of the method is difficult.

As a technology capable of avoiding such overheating, in Japanese Patent No. 4104584, a thermally-assisted magnetic recording head using surface plasmon polariton coupling is proposed. In this technology, without direct application of light propagating through a waveguide (guided light) to a plasmon generator, the guided light is coupled to the plasmon generator through evanescent coupling, and surface plasmon polaritons generated on a surface of the plasmon generator are used. To achieve higher recording density (higher capacity) from this time, near-field light with higher power density needs to be generated stably. However, since the thermally-assisted magnetic recording head which is now proposed uses a transverse-magnetic (TM) wave, it is actually difficult to provide high output of 100 mW or larger, for example. Accordingly, a thermally-assisted magnetic recording head which is capable of achieving higher recording density and has high operation stability is expected to be developed.

SUMMARY OF THE INVENTION

A thermally-assisted magnetic recording head according to an embodiment of the invention includes: a magnetic pole; a waveguide allowing a transverse-electric (TE) wave oscillating in a cross-track direction to propagate toward an air bearing surface; and a plasmon generator having a tip portion near the air bearing surface, the tip portion being provided to overlap, in a down-track direction, with both the magnetic pole and the waveguide, and having a quadrangular cross-section, substantially parallel to the air bearing surface.

A head gimbals assembly, a head arm assembly, and a magnetic disk unit according to an embodiment of the invention includes the above-described thermally-assisted magnetic recording head.

In the thermally-assisted magnetic recording head, and the head gimbals assembly, the head arm assembly, and the magnetic disk unit which are provided with the thermally-assisted magnetic recording head according to the embodiments of the invention, light propagating through the waveguide is a TE wave, and the plasmon generator has a quadrangular cross-section. Therefore, near-field light with high energy density and a small spot size is stably generated near the tip portion of the magnetic pole. As a result, magnetic recording with higher density is allowed to be more efficiently and stably performed.

In the thermally-assisted magnetic recording head and the like according to the embodiments of the invention, a laser light source emitting a TE wave toward the waveguide is preferably further provided. In addition, the plasmon generator is preferably provided between the magnetic pole and the waveguide in the down-track direction, for example. Moreover, the plasmon generator is preferably provided at a position overlapped, in the down-track direction, with both the magnetic pole and the waveguide. In such a case, the center positions of the plasmon generator, the magnetic pole, and the waveguide desirably coincide with one another.

Furthermore, in the thermally-assisted magnetic recording head and the like according to the embodiments of the invention, when the plasmon generator and the magnetic pole are arranged with a distance, a region at which near-field light is generated is closer to the magnetic pole. Alternatively, the plasmon generator and the magnetic pole may be arranged to be in contact with each other. In this case, the configuration is relatively easily manufactured.

Moreover, in the thermally-assisted magnetic recording head according to the embodiment of the invention, opposed portions of the plasmon generator and the magnetic pole preferably have respective widths equal to each other in the cross-track direction. In addition, the magnetic pole preferably has a portion whose width in the cross-track direction increases with increasing a distance from the tip portion of the plasmon generator, in order to improve dissipation of the heat generated by the plasmon generator.

DETAILED DESCRIPTION OF THE PREFERRED EMBODIMENTS

Hereinafter, a preferred embodiment of the invention will be described in detail with reference to drawings.

Embodiment

1. Configuration of Magnetic Disk Unit

First, referring to FIG. 1 and FIG. 2, a configuration of a magnetic disk unit will be described below as an embodiment of the invention.

Figure 1:
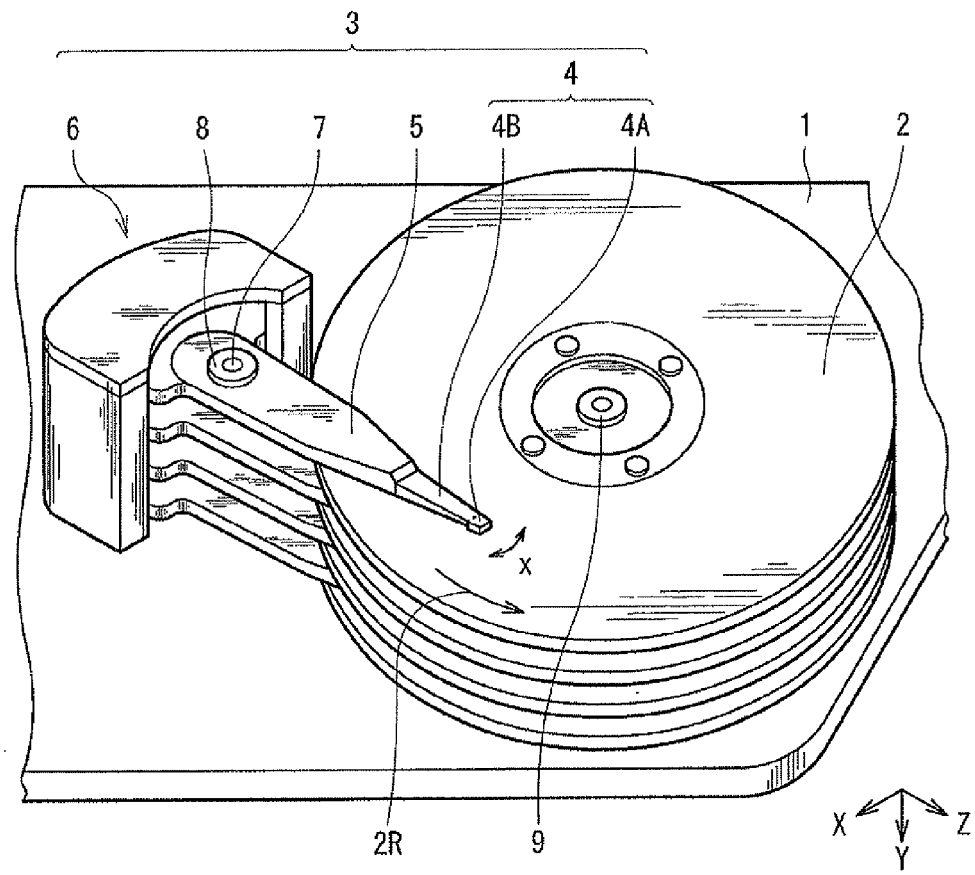
FIG. 1 is a perspective view illustrating a configuration of a magnetic disk unit provided with a thermally-assisted magnetic head device according to an embodiment of the invention.

FIG. 1 is a perspective view illustrating an internal configuration of the magnetic disk unit as the embodiment. The magnetic disk unit adopts load/unload system as a driving system, and includes, in a housing 1, a magnetic disk 2 as a magnetic recording medium in which information is to be written, and a head arm assembly (HAA) 3 for writing information in the magnetic disk 2 and reading the information. The HAA 3 is provided with a head gimbals assembly (HGA) 4, an arm 5 supporting a base of the HGA 4, and a driver 6 as a power source for rotating the arm 5. The HGA 4 includes a thermally-assisted magnetic head device (hereinafter, simply referred to as a "magnetic head device") 4A having a side surface provided with a magnetic read write head section 10 (described later) according to the embodiment, and a suspension 4B having an end portion provided with the magnetic head device 4A. The arm 5 supports the other end of the suspension 4B (an end portion opposite to the end portion provided with the magnetic head device 4A). The arm 5 is configured so as to be rotatable, through a bearing 8, around a fixed shaft 7 fixed to the housing 1. The driver 6 is configured of, for example, a voice coil motor. Incidentally, the magnetic disk unit has a plurality of (four in FIG. 1) magnetic disks 2, and the magnetic head device 4A is disposed corresponding to recording surfaces (a front surface and a back surface) of each of the magnetic disks 2. Each magnetic head device 4A is allowed to move in a direction across write tracks, that is, in a track width direction (in X-axis direction) in a plane parallel to the recording surface of each magnetic disk 2. On the other hand, the magnetic disk 2 is configured to rotate around a spindle motor 9 fixed to the housing 1 in a rotation direction 2R substantially orthogonal to the X-axis direction. With the rotation of the magnetic disk 2 and the movement of the magnetic head device 4A, information is written into the magnetic disk 2 or stored information is read out from the magnetic disk 2. Further, the magnetic disk unit has a control circuit (described later) which controls a write operation and a read operation of the magnetic read write head section 10, and controls an emission operation of a laser diode as a light source which generates laser light used for thermally-assisted magnetic recording (described later).

Figure 2:
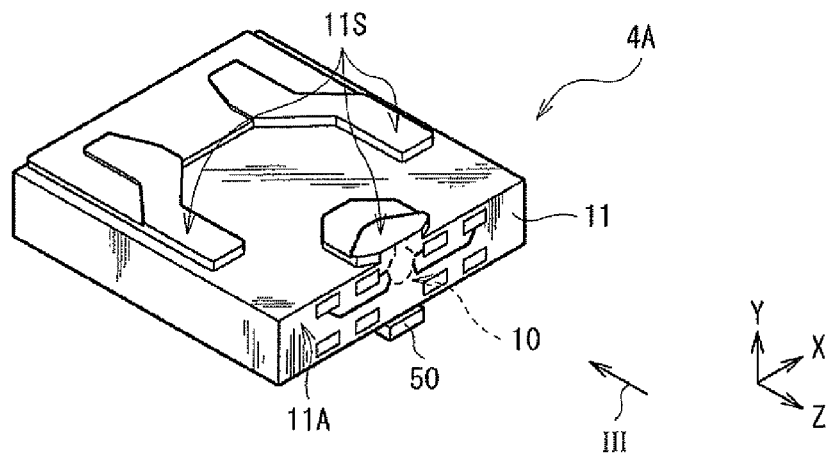
FIG. 2 is a perspective view illustrating a configuration of the thermally-assisted magnetic head device illustrated in FIG. 1.

FIG. 2 illustrates a configuration of the magnetic head device 4A illustrated in FIG. 1. The magnetic head device 4A has a block-shaped slider 11 made of, for example, $Al_2O_3$.TiC (AlTiC). The slider 11 is substantially formed as a hexahedron, for example, and one surface thereof corresponds to an ABS 11S disposed oppositely and proximally to the recording surface of the magnetic disk 2. When the magnetic disk unit is not driven, namely, when the spindle motor 9 is stopped and the magnetic disk 2 does not rotate, the magnetic head device 4A is pulled off to the position away from the magnetic disk 2 (unload state), in order to prevent contact of the ABS 11S and the recording surface. In contrast, when the magnetic disk unit is initiated, the magnetic disk 2 starts to rotate at a high speed by the spindle motor 9, and the arm 5 is rotationally moved around the fixed shaft 7 by the driver 6. Therefore, the magnetic head device 4A moves above the front surface of the magnetic disk 2, and is in a load state. The rotation of the magnetic disk 2 at a high speed leads to air flow between the recording surface and the ABS 11S, and lift force caused by the air flow leads to a state where the magnetic head device 4A floats to maintain a certain distance (magnetic spacing) MS (in FIG. 5 described later) along a direction (Y-axis direction) orthogonal to the recording surface. In addition, on the element forming surface 11A that is one side surface orthogonal to the ABS 11S, the magnetic read write head section 10 is provided. Incidentally, on a surface 11B opposite to the ABS 11S of the slider 11, a light source unit 50 is provided near the magnetic read write head section 10.

2. Detailed Configuration of Magnetic Read Write Head Section

Figure 3:
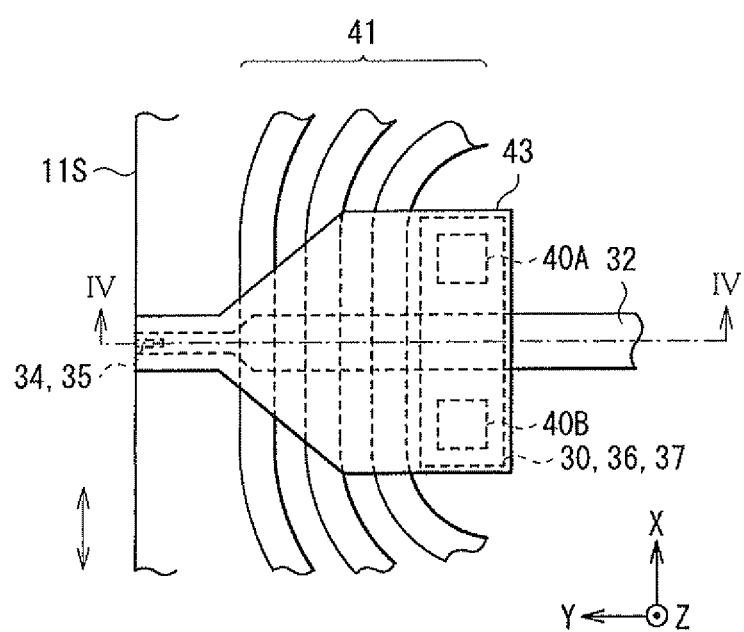
FIG. 3 is a plan view illustrating a configuration of a main part of a magnetic read write head section viewed from an arrow III direction illustrated in FIG. 2.
Figure 4:
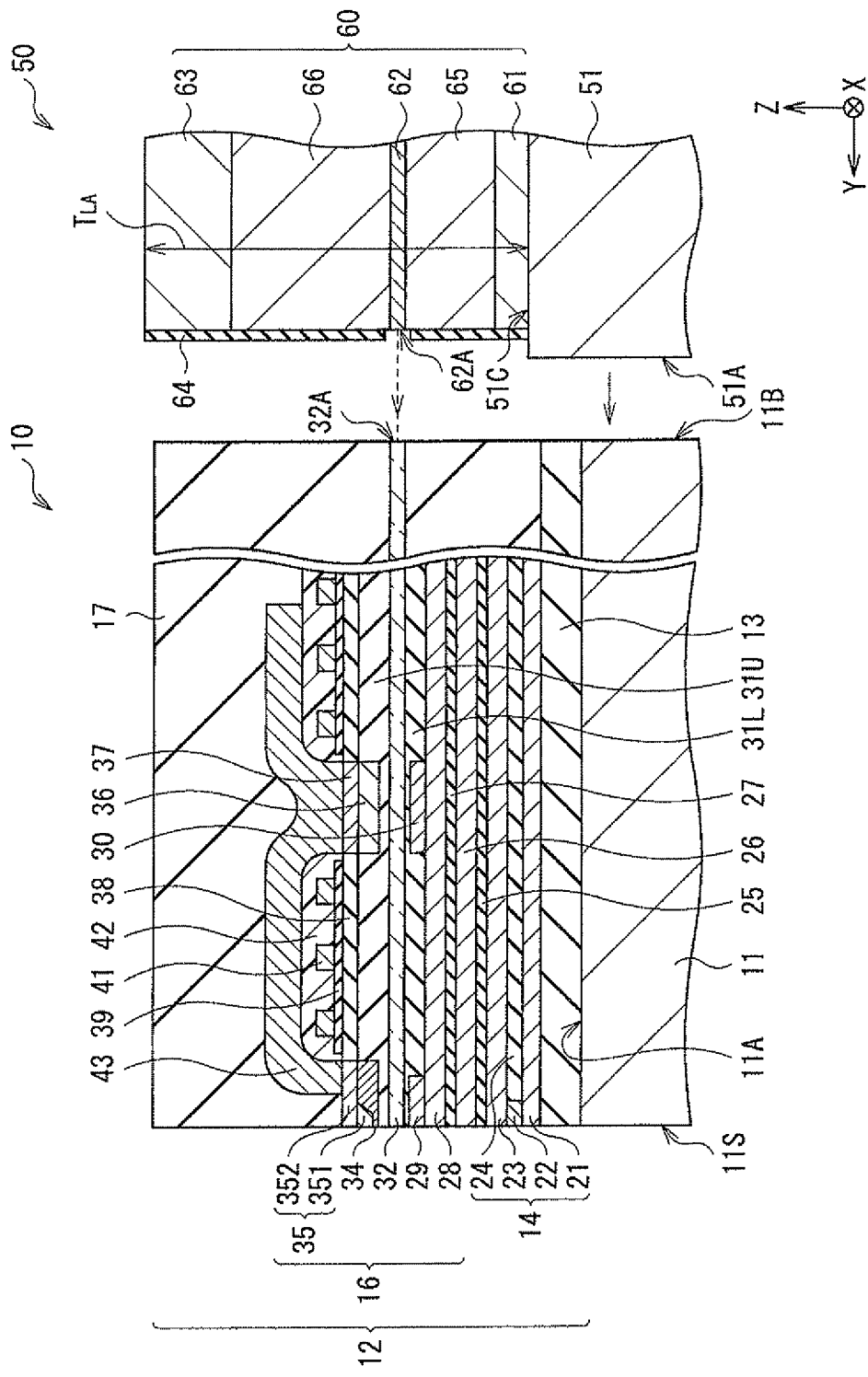
FIG. 4 is a sectional view illustrating a configuration of the magnetic read write head section viewed from an arrow direction along a IV-IV line illustrated in FIG. 3.
Figure 5:
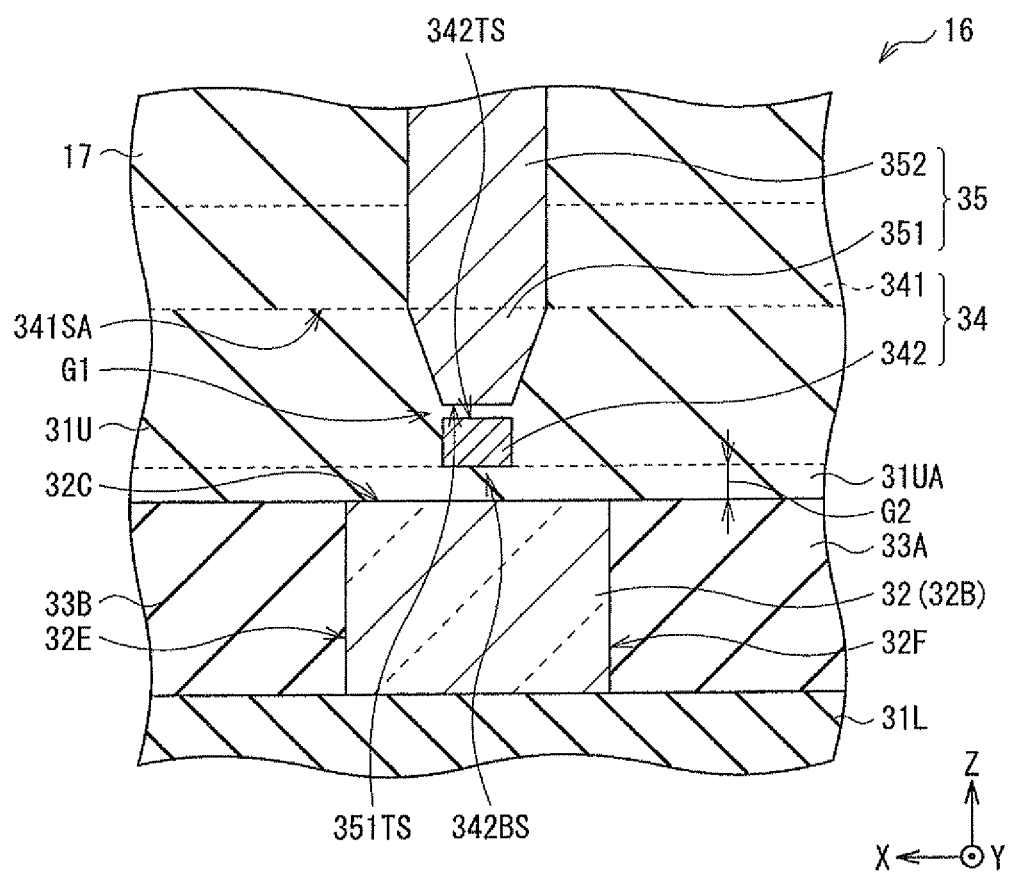
FIG. 5 is a plan view illustrating a configuration of an end surface exposed on an air bearing surface, of a write head section illustrated in FIG. 4.

Next, the magnetic read write head section 10 is described in more detail with reference to FIG. 3 to FIG. 5. FIG. 3 is a plan view of the magnetic read write head section 10 viewed from a direction of an arrow III illustrated in FIG. 2, FIG. 4 is a sectional view illustrating a configuration thereof in an arrow direction along a IV-IV line illustrated in FIG. 3, and FIG. 5 illustrates a part of an end surface, exposed on the ABS 11S, of the magnetic read write head section 10 in an enlarged manner. The magnetic read write head section 10 has a stacked structure including an insulating layer 13, a read head section 14, a write head section 16, and a cladding 17 which are embedded in an element forming layer 12 provided on a slider 11 and are stacked in order on the slider 11. Each of the read head section 14 and the write head section 16 has an end surface exposed on the ABS 11S. Incidentally, the ABS 11S is preferably covered with a protective film (not illustrated).

The read head section 14 performs a read process using magneto-resistive effect (MR). The read head section 14 is configured by stacking, for example, a lower shield layer 21, an MR element 22, and an upper shield layer 23 in order on the insulating layer 13.

The lower shield layer 21 and the upper shield layer 23 are respectively formed of a soft magnetic metal material such as NiFe (nickel iron alloy), and are disposed to face each other with the MR element 22 in between in the stacking direction (in Z-axis direction). As a result, the lower shield layer 21 and the upper shield layer 23 each exhibit a function to protect the MR element 22 from the influence of unnecessary magnetic field.

One end surface of the MR element 22 is exposed on the ABS 11S, and the other end surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), or DLC (diamond-like carbon).

The MR element 22 functions as a sensor for reading magnetic information written in the magnetic disk 2. Note that in the embodiment, in a direction (Y-axis direction) orthogonal to the ABS 11S, a direction toward the ABS 11S with the MR element 22 as a base or a position near the ABS 11S is called "front side". A direction toward opposite side from the ABS 11S with the MR element 22 as a base or a position away from the ABS 11S is called "back side". The MR element 22 is, for example, a CPP (current perpendicular to plane)—GMR (giant magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current is allowed to flow through the MR element 22, the relative change in the magnetization direction appears as the change of the electric resistance. Therefore, the read head section 14 detects the signal magnetic field using the change to read the magnetic information.

On the read head section 14, an insulating layer 25, an intermediate shield layer 26, and an insulating layer 27 are stacked in order. The intermediate shield layer 26 functions to prevent the MR element 22 from being affected by a magnetic field which is generated in the write head section 16, and is formed of, for example, a soft magnetic metal material such as NiFe. The insulating layers 25 and 27 are formed of the similar material to the insulating layer 24.

The write head section 16 is a vertical magnetic recording head performing a recording process of thermally-assisted magnetic recording system. The write head section 16 has, for example, a lower yoke layer 28, a leading shield 29 and a connecting layer 30, a cladding 31L, a waveguide 32, claddings 33A and 33B, and a cladding 31U in order on the insulating layer 27. The claddings 33A and 33B configure a first cladding pair sandwiching the waveguide 32 in the track-width direction (in the X-axis direction). On the other hand, the claddings 31L and 31U configure a second cladding pair sandwiching the waveguide 32 in the thickness direction (in the Z-axis direction). Note that the leading shield 29 may be omitted from the structure.

The waveguide 32 allows laser light of a TE wave, which is emitted from the light source unit 50 and has an oscillation direction along a cross-track direction (the X-axis direction), to propagate to the ABS 11S. For example, the waveguide 32 has a size that is larger in the X-axis direction than in a down-track direction (the Z-axis direction). The waveguide 32 is formed of a dielectric material allowing laser light to pass therethrough. Examples of the constituent material of the waveguide 32 include SiC, DLC, TiOx (titanium oxide), TaOx (tantalum oxide), SiNx (silicon nitride), SiOxNy (silicon oxynitride), Si (silicon), ZnSe (zinc selenide), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). The claddings 33A, 33B, 31L, and 31U are formed of a dielectric material having a refractive index, with respect to laser light propagating through the waveguide 32, lower than that of a constituent material of the waveguide 32. In terms of the refractive index with respect to laser light propagating through the waveguide 32, the dielectric material constituting the claddings 33A and 33B and the dielectric material constituting the claddings 31L and 31U may be the same or different from each other. Examples of the dielectric material constituting the claddings 33A, 33B, 31L, and 31U include SiOx (silicon oxide), $Al_2O_3$ (aluminum oxide), AlN (aluminum nitride), and $Al_2O_3$.

The lower yoke layer 28, the leading shield 29, and the connecting layer 30 are each made of a soft magnetic metal material such as NiFe. The leading shield 29 is located at the frontmost end of the upper surface of the lower yoke layer 28 so that one end surface of the leading shield 29 is exposed on the ABS 11S. The connecting layer 30 is located at the rear of the leading shield 29 on the upper surface of the lower yoke layer 28. The cladding 31L is made of a dielectric material having a refractive index, with respect to laser light propagating through the waveguide 32, lower than that of the waveguide 32, and is provided to cover the lower yoke layer 28, the leading shield 29, and the connecting layer 30. The waveguide 32 provided on the cladding 31L extends in a direction (Y-axis direction) orthogonal to the ABS 11S, one end surface of the waveguide 32 is exposed on the ABS 11S, and the other end surface is exposed at the backward thereof. Note that the front end surface of the waveguide 32 may be located at a receded position from the ABS 11S without being exposed on the ABS 11S. In the waveguide 32, the shape of a cross-section parallel to the ABS 11S is, for example, a rectangular shape, but may be the other shapes.

The write head section 16 includes a plasmon generator 34 provided above the front end of the waveguide 32 through the cladding 31U, and a magnetic pole 35 provided to be in contact with the upper surface of the plasmon generator 34. The plasmon generator 34 and the magnetic pole 35 are arranged so that one end surface 34T of the plasmon generator 34 and one end surface 35T of the magnetic pole 35 are exposed on the ABS 11S. In this case, the plasmon generator 34 and the magnetic pole 35 are adjacent to and separated away from each other on and near the ABS 11S. Therefore, a gap G1 is generated between the plasmon generator 34 and the magnetic pole 35. The gap G1 is filled with a non-magnetic insulating material (such as alumina) and the like. Accordingly, the end surface 34T is separated from the end surface 35T (see FIG. 5). The magnetic pole 35 has a structure in which a first layer 351 and a second layer 352 are stacked in order from a position near the waveguide 32, for example. Both the first layer 351 and the second layer 352 are formed of a magnetic material with high saturation flux density such as iron-based alloy. Examples of the iron-based alloy include FeCo (iron cobalt alloy), FeNi (iron nickel alloy), and FeCoNi (iron cobalt nickel alloy). The plasmon generator 34 generates near-field light NF (described later) from the ABS 11S, based on the laser light which has propagated through the waveguide 32. The magnetic pole 35 stores therein magnetic flux generated in a coil 41 (described later), releases the magnetic flux from the ABS 11S, thereby generating a write magnetic field for writing magnetic information into the magnetic disk 2. The plasmon generator 34 and the first layer 351 are embedded in the cladding 31U. The details such as configurations and functions of the plasmon generator 34 and the magnetic pole 35 will be described later.

The write head section 16 further includes a connecting layer 36 embedded in the cladding 31U at the rear of the plasmon generator 34 and the magnetic pole 35, and a connecting layer 37 provided to be in contact with the upper surface of the connecting layer 36. Both the connecting layers 36 and 37 are arranged above the connecting layer 30 and are formed of a soft magnetic metal material such as NiFe.

The write head section 16 includes two connecting sections 40A and 40B (FIG. 3) which are embedded in the claddings 31U, 33A, and 33B. The connecting sections 40A and 40B are also formed of a soft magnetic metal material such as NiFe. The connecting sections 40A and 40B extend in the Z-axis direction so as to connect the connecting layer 30 and the connecting layer 36, and are arranged in X-axis direction so as to sandwich the waveguide 32 with a distance.

As illustrated in FIG. 4, on the cladding 31U, an insulating layer 38 is provided to fill a space around the second layer 352 of the magnetic pole 35. An insulating layer 39 and the coil 41 which is formed in spiral around the connecting layer 37 are stacked in order on the insulating layer 38. The coil 41 is intended to generate magnetic flux for writing by flow of a write current, and is formed of a high conductive material such as Cu (copper) and Au (gold). The insulating layers 38 and 39 are configured of an insulating material such as $Al_2O_3$, AlN, $SiO_2$ or DLC. The insulating layers 38 and 39 and the coil 41 are covered with an insulating layer 42, and an upper yoke layer 43 is further provided to cover the insulating layer 42. The insulating layer 42 is configured of, for example, a non-magnetic insulating material flowing on heating, such as a photoresist or a spin on glass (SOG). The insulating layers 38, 39, and 42 electrically separate the coil 41 from other nearby devices. The upper yoke layer 43 is formed of a soft magnetic material with high saturation flux density such as CoFe, the front portion thereof is connected to the second layer 352 of the magnetic pole 35, and a part of the rear portion is connected to the connecting layer 37. In addition, the front end surface of the upper yoke layer 43 is located at a receded position from the ABS 11S.

In the write head section 16 with such a structure, by the write current flowing through the coil 41, magnetic flux is generated inside a magnetic path which is mainly configured by the leading shield 29, the lower yoke layer 28, the connecting layer 30, the connecting sections 40A and 40B, the connecting layers 36 and 37, the upper yoke layer 43, and the magnetic pole 35. Accordingly, a signal magnetic field is generated near the end surface of the magnetic pole 35 exposed on the ABS 11S, and the signal magnetic field reaches a predetermined region of the recording surface of the magnetic disk 2.

Further, in the magnetic read write head section 10, for example, the cladding 17 made of similar material to the cladding 31U is formed to cover the entire upper surface of the write head section 16.

The light source unit 50 provided at the rear of the magnetic read write head section 10 includes a laser diode 60 as a light source emitting laser light, and a rectangular-solid supporting member 51 supporting the laser diode 60, for example, as illustrated in FIG. 4.

The supporting member 51 is formed of, for example, a ceramic material such as $Al_2O_3$.TiC. As illustrated in FIG. 4, the supporting member 51 includes a bonding surface 51A to be adhered to a back surface 11B of the slider 11, and a light source mounting surface 51C orthogonal to the bonding surface 51A. The light source mounting surface 51C is parallel to the element forming surface 11A, and the laser diode 60 is mounted on the light source mounting surface 51C. The supporting member 51 desirably has a function of a heatsink dissipating heat generated by the laser diode 60, in addition to the function to support the laser diode 60.

Laser diodes generally used for communication, for optical disc storage, or for material analysis, for example, InP-based, GaAs-based, or GaN-based laser diodes, may be used as the laser diode 60. The wavelength of the laser light emitted from the laser diode 60 may be any value within the range of, for example, 375 nm to 1.7 μm. Specifically, examples of such a laser diode include a laser diode of InGaAsP/InP quaternary mixed crystal with the emission wavelength region of 1.2 to 1.67 μm. As illustrated in FIG. 4, the laser diode 60 has a multilayer structure including a lower electrode 61, an active layer 62, and an upper electrode 63. For example, an n-type semiconductor layer 65 including n-type AlGaN is inserted between the lower electrode 61 and the active layer 62, and for example, a p-type semiconductor layer 66 including p-type AlGaN is inserted between the active layer 62 and the upper electrode 63. On each of two cleavage surfaces of the multilayer structure, a reflective layer 64 formed of $SiO_2$, $Al_2O_3$, or the like is provided to totally reflect light and excite oscillation. In the reflective layer 64, an aperture for emitting laser light is provided at a position including an emission center 62A of the active layer 62. The relative positions of the light source unit 50 and the magnetic read write head section 10 are fixed by adhering the bonding surface 51A of the supporting member 51 to the back surface 11B of the slider 11 so that the emission center 62A and the rear end surface 32A of the waveguide 32 are coincident with each other. The thickness $T_{LA}$ of the laser diode 60 is, for example, within a range of about 60 to about 200 μm. A predetermined voltage is applied between the lower electrode 61 and the upper electrode 63 so that laser light is emitted from the emission center 62A of the active layer 62, and then enters the rear end surface 32A of the waveguide 32. The laser light emitted from the laser diode 60 is preferably polarized light of a TM mode whose electric field oscillates in a direction perpendicular to the surface of the active layer 62. The laser diode 60 may be driven with use of a power source in the magnetic disk unit. The magnetic disk unit generally includes a power source generating a voltage of about 2 V, for example, and the voltage generated by the power source is sufficient to drive the laser diode 60. In addition, the laser diode 60 consumes power of about several tens mW, which may be sufficiently covered by the power source in the magnetic disk unit.

Figure 6:
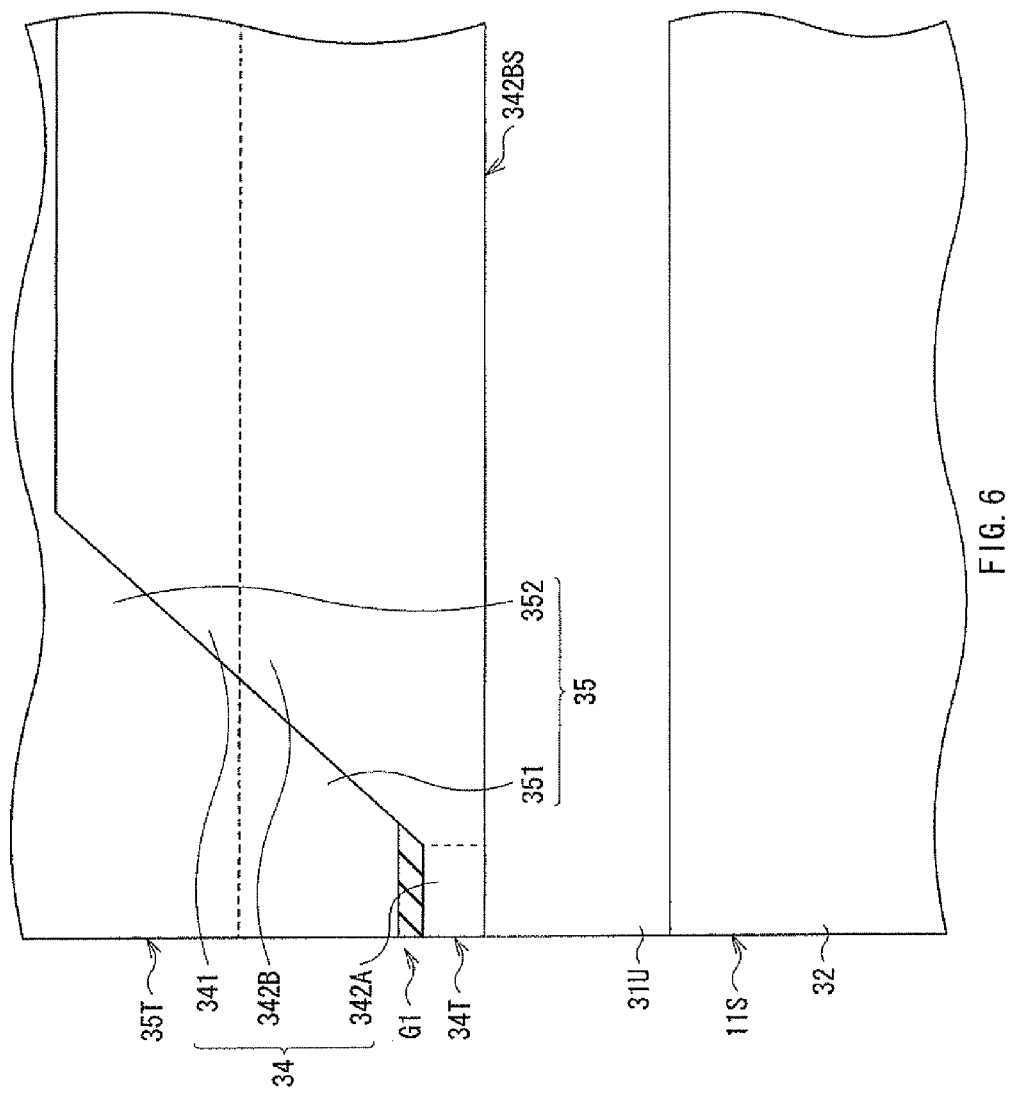
FIG. 6 is a sectional view illustrating, in an enlarged manner, the write head section illustrated in FIG. 4.
Figure 7:
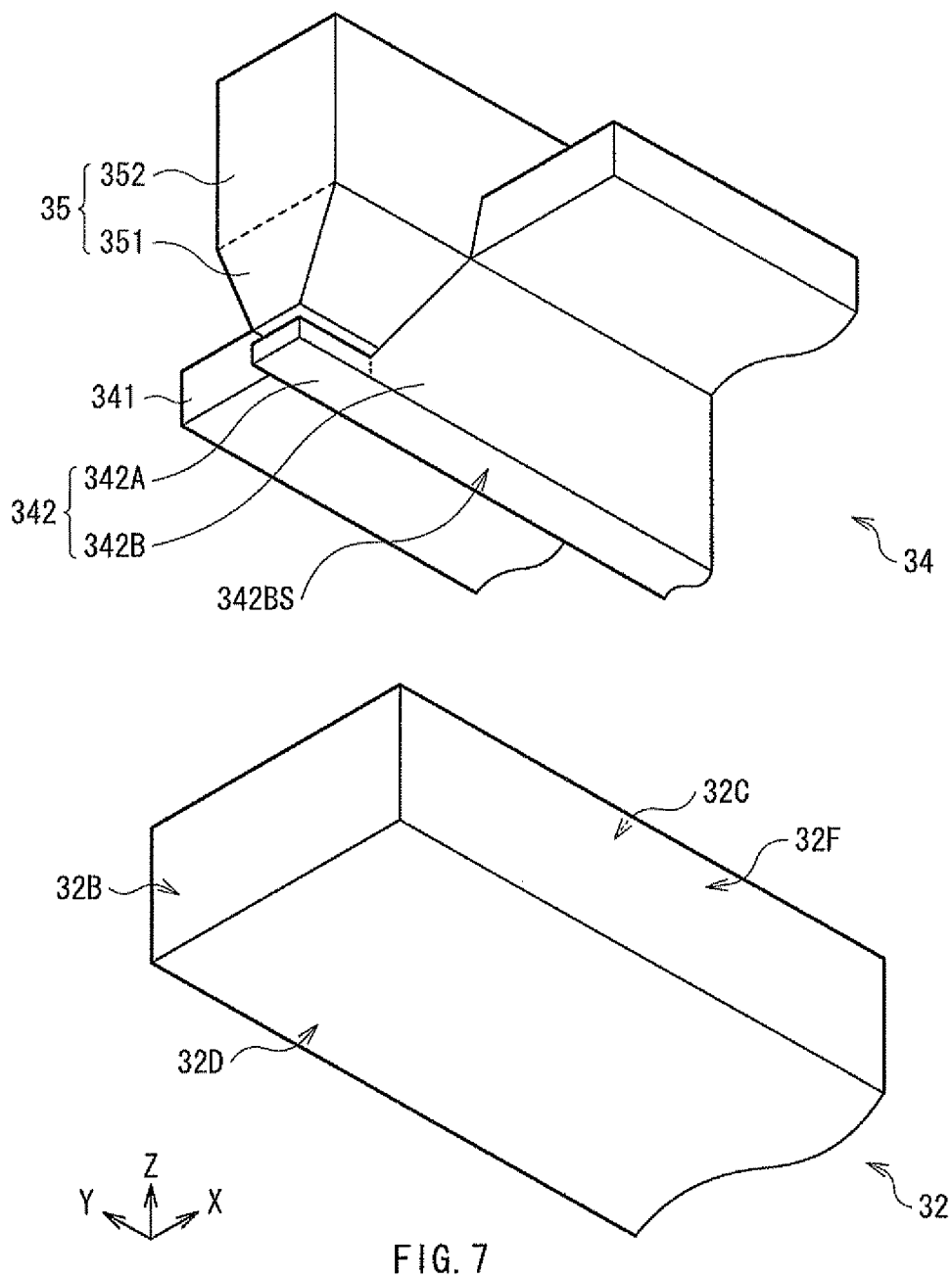
FIG. 7 is a perspective view illustrating a detailed shape of a plasmon generator illustrated in FIG. 6.
Figure 8:
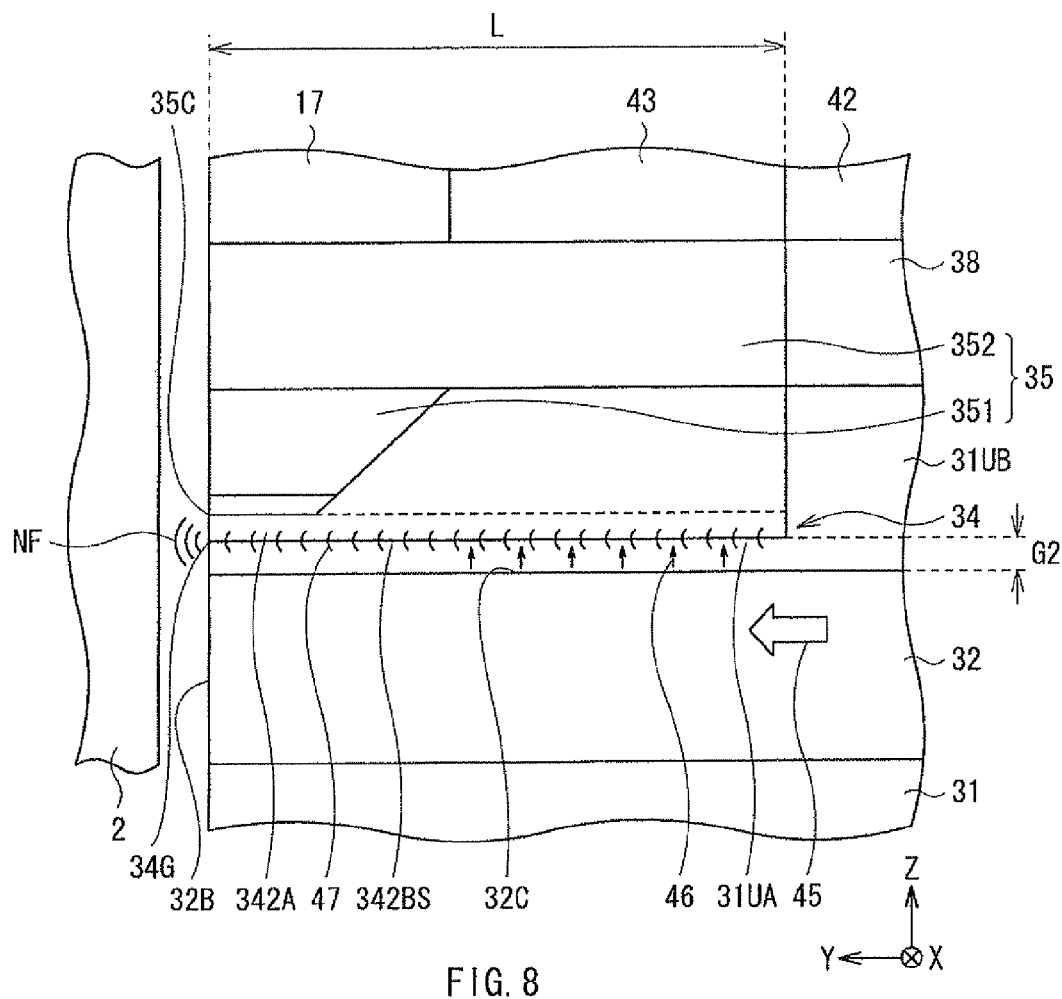
FIG. 8 is an explanatory diagram for explaining functions of the magnetic read write head section.

Next, referring to FIG. 6 to FIG. 8 in addition to FIG. 5, the configuration and the functions of each of the waveguide 32, the plasmon generator 34, and the magnetic pole 35 will be described in detail. FIG. 6 is an enlarged sectional view illustrating a part (near the plasmon generator 34 described later) of FIG. 5, and FIG. 7 is a perspective view illustrating the detail of the shape of the plasmon generator. Incidentally, in FIG. 6 and FIG. 7, the distance between the plasmon generator 34 and the waveguide 32 is illustrated to be wider than actual distance, in order to avoid complications, for the sake of explaining the shape of the plasmon generator 34. In addition, FIG. 8 is a sectional view illustrating the configurations and the functions of the waveguide 32, the plasmon generator 34, and the magnetic pole 35, and the illustrated cross-section is orthogonal to the ABS 11S.

As illustrated in FIG. 5 and FIG. 7, for example, the waveguide 32 includes an end surface 32B closer to the ABS 11S, an evanescent light generating surface 32C as an upper surface, a lower surface 32D, and two side surfaces 32E and 32F, besides the rear end surface 32A illustrated in FIG. 4.

The evanescent light generating surface 32C generates evanescent light based on the laser light propagating through the waveguide 32. In FIG. 4 and the like, although the case where the end surface 32B is arranged on the ABS 11S is exemplified, the end surface 32B may be arranged at a position (receded position) distanced backward from the ABS 11S.

As illustrated in FIG. 5 to FIG. 7, the plasmon generator 34 has a base 341 extending along an XY plane, and a projection 342. The projection 342 is provided to stand partially on a surface 341S of the base 341, which faces the evanescent light generating surface 32C of the waveguide 32, so as to project toward the waveguide 32 (in the Z-axis direction), and the projection 342 extends in the Y-axis direction.

The projection 342 has a tip portion 342A and a rear portion 342B. The tip portion 342A is located at a position nearest to the ABS 11S, and is located between the magnetic pole 35 and the waveguide 32 in the Z-axis direction. The rear portion 342B is located at the rear of the tip portion 342A and a part (the first layer 351) of the magnetic pole 35. The base 341 and the rear portion 342B function to improve the heat dissipation of the plasmon generator 34. The shape of a cross-section of the tip portion 342A parallel to the ABS 11S is quadrangular, for example, rectangular or trapezoidal. The cross-section has a size that is larger in the X-axis direction than in the Z-axis direction, for example. The top potion 342A is provided at a position overlapped, in the Z-axis direction, with the magnetic pole 35. In particular, in the X-axis direction, the central position of the magnetic pole 35 desirably coincides with the central position of the tip portion 342A. Examples of the constituent material of the plasmon generator 34 include conductive materials including one or more of Pd (palladium), Pt (platinum), Rh (rhodium), Ir (iridium), Au (gold), Ag (silver), Cu (copper), and Al (aluminum). Here, the constituent materials of the base 341 and the projection 342 may be the same kind or different kinds.

The magnetic pole 35 has a first portion 351 which is embedded in the cladding 31U and is located between the rear portion 342B of the projection 342 and the ABS 11S, and a second portion 352 which is embedded in the cladding 17 and covers the first portion 351 and the base 341. The first portion 351 of the magnetic pole 35 has such a shape that a width in the X-axis direction is increased with increasing a distance from the tip portion 342A of the plasmon generator 34. In other words, the first portion 351 has a trapezoidal shape in which the cross-section parallel to the ABS 11S has a width wider than that of the lower surface 351TS facing the upper surface 342TS of the tip portion 342A, at the portion connected with the second portion 352. With the shape of the first portion 351, dissipation of heat generated in the plasmon generator 34 (in particular, in the tip portion 342A) during operation is allowed to be increased. However, an inclined angle of the side surface of the first portion 351 relative to the Z-axis direction is desirably equal to or smaller than 45° because if the width of the second portion 352 in the X-axis direction is excessively large, the coupling efficiency between the tip portion 342A and the TE wave propagating through the waveguide 32 is decreased, and thus the intensity of the near-field light is decreased. Opposed portions of the tip portion 342A and the first portion 351 preferably have respective widths equal to each other in the X-axis direction. In other words, the upper surface 342TS of the tip portion 342A is preferably has the same width as the lower surface 351TS of the first portion 351, which faces the upper surface 342TS. This is because higher coupling efficiency is obtainable. Since the width in the polarization direction of the TE wave propagating through the waveguide 32 extends along the X-axis direction, if there is a difference between the size on the upper surface 342TS and that on the lower surface 351TS in that direction, easily-coupling length is limited by the difference, and thus it is difficult to achieve high coupling efficiency.

As illustrated in FIG. 8, in the cladding 31U, a portion arranged between the evanescent light generating surface 32C and the lower surface 342BS of the tip portion 342A corresponds to a buffer portion 31UA. In the cladding 31U, a portion located at the rear of the plasmon generator 34 and the first portion 351 corresponds to a rear portion 31UB.

3. Functions of Magnetic Read Write Head Section

Next, functions of the magnetic read write head section 10 with the above-described configuration is described with reference to FIG. 8. As illustrated in FIG. 8, at the time of performing writing into the magnetic recording layer of the magnetic disk 2 by the write head section 16, first, the laser light 45 emitted from the laser diode 60 of the light source unit 50 propagates through the waveguide 32, and reaches near the buffer portion 31UA which is sandwiched between the plasmon generator 34 and the waveguide 32. The laser light 45 is a TE wave having oscillation direction along the X-axis, and has a wavelength equal to or larger than 400 nm and equal to or smaller than 800 nm, for example. Herein, the laser light 45 is totally reflected by the evanescent light generating surface 32C, which is an interface between the waveguide 32 and the buffer portion 31UA, so that evanescent light 46 leaking into the buffer portion 31UA is excited. After that, the evanescent light 46 couples with fluctuation of a charge which is excited at the lower surface 342BS of the projection 342 of the plasmon generator 34 to induce a surface plasmon polariton mode, and therefore surface plasmons are excited. Incidentally, to be precise, in this system, since the surface plasmon as elementary excitation couples with an electromagnetic wave, excited is a surface plasmon polariton. However, hereinafter, the surface plasmon polariton is abbreviated as a surface plasmon. Induction of the surface plasmon mode is allowed by setting the refractive index of the buffer portion 31UA to be smaller than that of the waveguide 32, and appropriately selecting the length of the buffer portion 31UA in the Y-axis direction, that is, the length L of the coupling portion between the waveguide 32 and the plasmon generator 34, and the thickness (a gap G2 between the waveguide 32 and the projection 342) of the buffer portion 31UA in the Z-axis direction. In the induced surface plasmon mode, surface plasmons 47 are excited at the lower surface 342BS of the projection 342, and then propagate on the lower surface 342BS toward the ABS 11S. The surface plasmons 47 eventually reach a tip portion 34G (an end portion closest to the ABS 11S of the lower surface 342BS) of the plasmon generator 34. As a result, at the tip portion 34G, the surface plasmons 47 are collected, and near-field light NF is generated from the tip portion 34G, based on the surface plasmons 47. The near-field light NF is applied to the magnetic disk 2, reaches the surface of the magnetic disk 2, and heats a part of the magnetic recording layer of the magnetic disk 2. Therefore, anisotropic magnetic field (coercivity) at the part is decreased to a value which enables writing, and thus writing is performed at that part by applied recording magnetic field.

4. Method of Manufacturing Magnetic Read Write Head

In addition to FIG. 4, referring to FIG. 9 to FIG. 14, a method of manufacturing the magnetic read write head section 10 is described. FIG. 9 to FIG. 12 each illustrate a configuration of a cross-section which eventually becomes the ABS 11S, for explaining formation processes of a main part of the magnetic read write head section 10. In addition, FIG. 13 and FIG. 14 each illustrate a configuration of a cross-section orthogonal to a surface which eventually becomes the ABS 11S. In the following description, first, an outline of the entire manufacturing process will be described with reference to FIG. 4, and then formation processes of the main part (the cladding 33, the plasmon generator 34, the magnetic pole 35, and the cladding 17) will be described in detail with reference to FIG. 9 to FIG. 14. At that time, since the details of the materials, the shapes, and the like of the components have been already described, the description thereof will be omitted as appropriate.

The magnetic read write head section 10 is mainly manufactured by sequentially forming and stacking a series of components by using an existing thin film process. Examples of the existing thin film process include film forming techniques such as an electrolytic plating and a sputtering, patterning techniques such as a photolithography, etching techniques such as dry etching and wet etching, and polishing techniques such as chemical mechanical polishing (CMP).

Herein, first, the insulating layer 13 is formed on the slider 11. Next, the lower shield layer 21, the MR element 22 and the insulating layer 24, and the upper shield layer 23 are formed by stacking in this order on the insulating layer 13 to form the read head section 14. Subsequently, the insulating layer 25, the intermediate shield layer 26, and the insulating layer 27 are stacked in order on the read head section 14.

After that, the lower yoke layer 28, the leading shield 29 and the connecting layer 30, the cladding 31, the waveguide 32, the cladding 33, the plasmon generator 34, the magnetic pole 35, and the connecting layers 36 and 37 are formed in order on the insulating layer 27. Note that the formation of the leading shield 29 may be omitted. Further, by performing a planarization process after the insulating layer 38 is formed to cover the entire surface, the upper surfaces of the magnetic pole 35, the insulating layer 38, and the connecting layer 37 are planarized. Subsequently, the coil 41 embedded in the insulating layers 39 and 42 is formed. Moreover, the upper yoke layer 43 connected with the magnetic pole 35 and the connecting layer 37 is formed to complete the write head section 16. After that, the cladding 17 is formed on the write head section 16, and by using CMP method or the like, the side surface of the stacked structure from the slider 11 to the cladding 17 is totally polished to form the ABS 11S. As a result, the magnetic read write head section 10 is completed.

Figure 9:
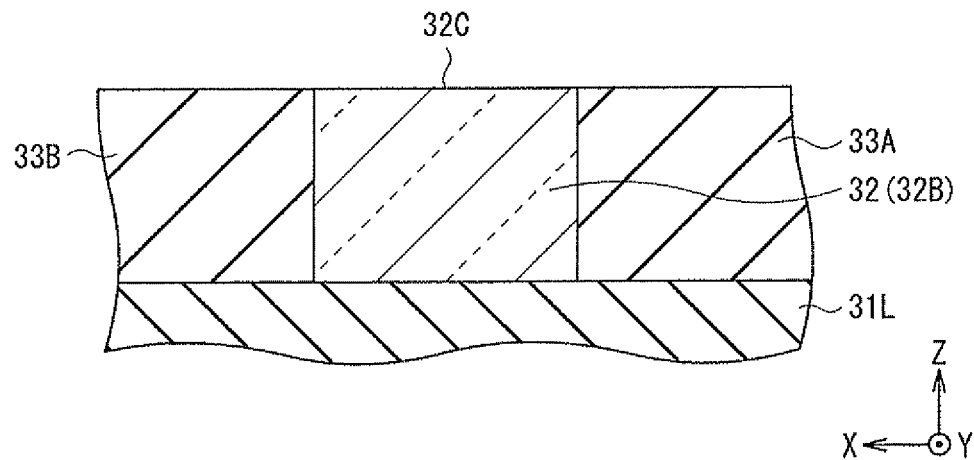
FIG. 9 is a sectional view for explaining a manufacturing process of a main part of the magnetic read write head section.

When the main part of the magnetic read write head section 10 is formed, first, a dielectric layer (not illustrated) is formed to cover the waveguide 32 provided on the cladding 31L. The dielectric layer becomes a part of the cladding 33 later, and is formed of the above-described predetermined dielectric materials. After that, the dielectric layer is polished by using CMP method or the like until the upper surface (that is, the evanescent light generating surface 32C) of the waveguide 32 is exposed, to form the flat plane. Accordingly, as illustrated in FIG. 9, the waveguide 32 and a pair of claddings 33A and 33B which sandwich the waveguide 32 in the track-width direction are formed on the upper surface of the cladding 31L. Alternatively, the dielectric layer is formed on the cladding 31L in first, and a pair of claddings 33A and 33B is formed by providing a through hole reaching the upper surface of the cladding 31L on the dielectric layer, and then the waveguide 32 may be formed to fill the through hole.

Figure 10:
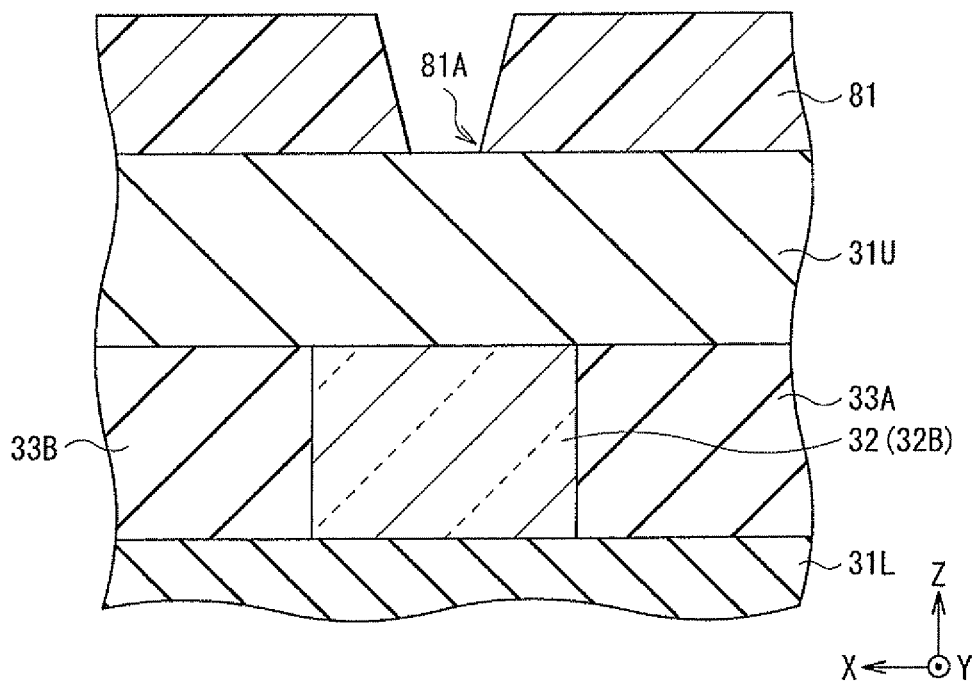
FIG. 10 is a sectional view for explaining a process following the process of FIG. 9.

Next, as illustrated in FIG. 10, with use of the above-described predetermined dielectric materials, the cladding 31U is formed to cover a flat plane which is defined by the waveguide 32 and the pair of claddings 33A and 33B. The upper surface of the cladding 31U is subjected to planarization process as needed. After that, an etching mask 81 made of, for example, photoresist is formed on the cladding 31U. The etching mask 81 has an aperture 81A extending in the Y-axis direction. The aperture 81A has a size slightly larger than the width of the projection 342 of the plasmon generator 34 which is formed later.

Figure 11:
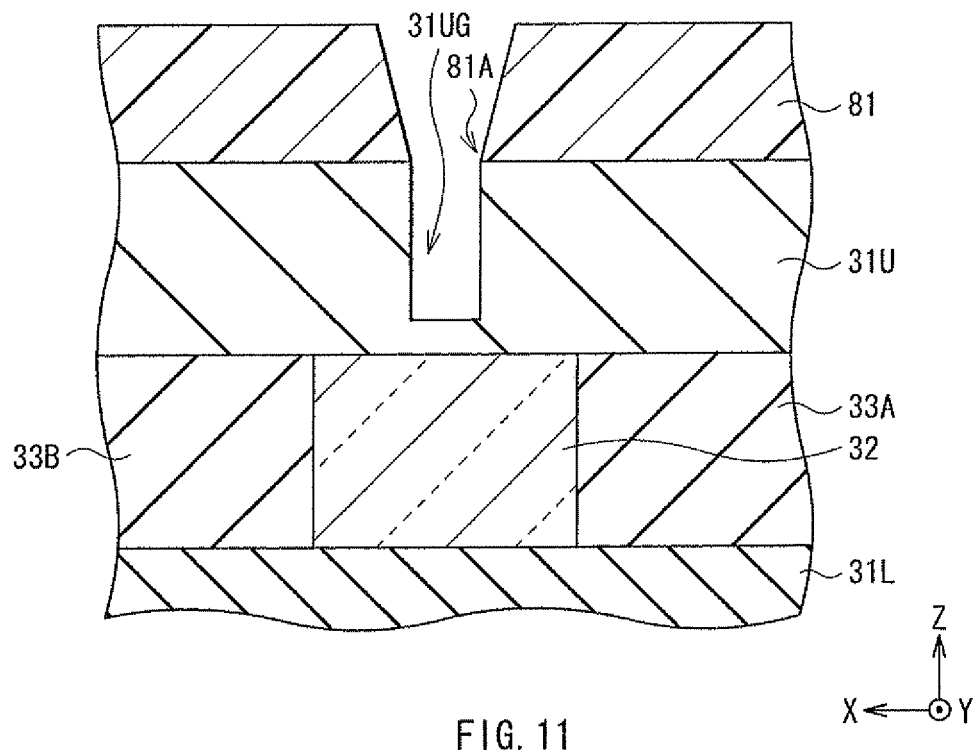
FIG. 11 is a sectional view for explaining a process following the process of FIG. 10.

Subsequently, as illustrated in FIG. 11, a portion (exposed portion) of the cladding 31U corresponding to the aperture 81A is dug down by, for example, reactive ion etching, to form, in the cladding 31U, a groove 31UG which has a rectangular or trapezoidal cross-section. The groove 31UG is formed so that the bottom surface thereof is close to the upper surface (that is, the evanescent light generating surface 32C) of the waveguide 32.

Figure 12:
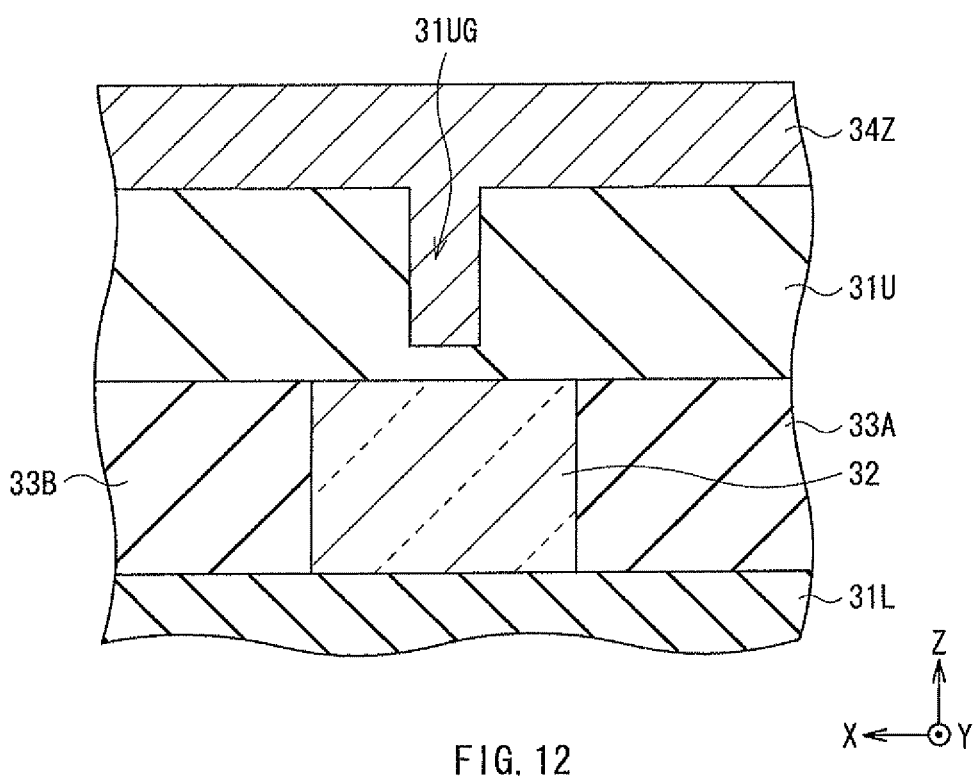
FIG. 12 is a sectional view for explaining a process following the process of FIG. 11.
Figure 13:
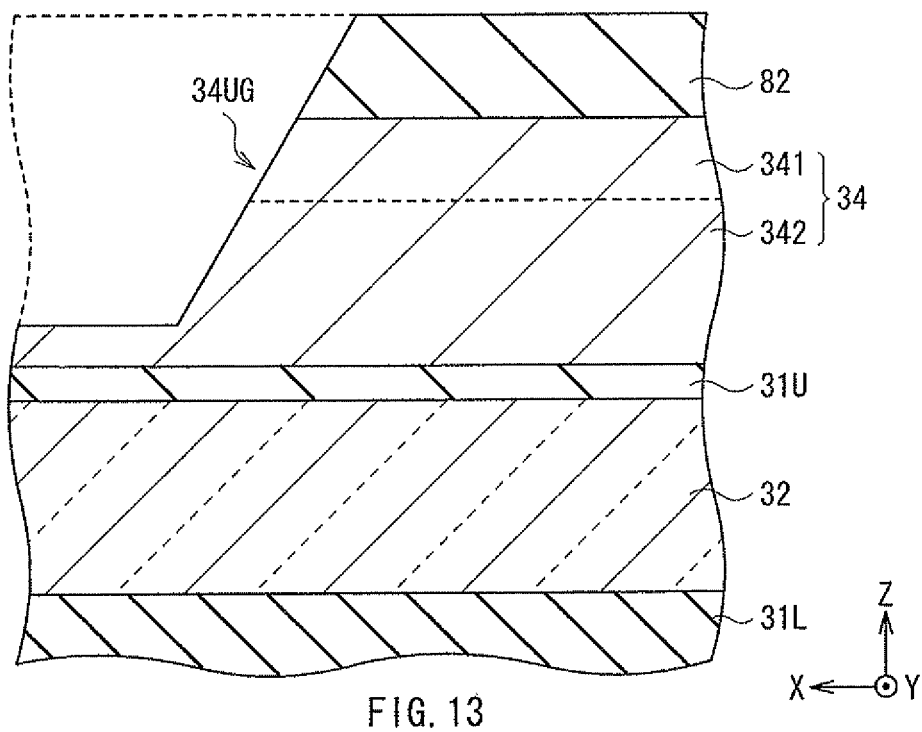
FIG. 13 is a sectional view for explaining a process following the process of FIG. 12.

Then, as illustrated in FIG. 12, after the etching mask 81 is lifted off, a metal layer 34Z is formed to cover the upper surface of the entire structure including the groove 31UG by, for example, sputtering or ion beam deposition (IBD) method. After that, as illustrated in FIG. 13, an etching mask 82 is selectively formed on the metal layer 34Z. Furthermore, a front portion of the metal layer 34Z which is not covered with the etching mask 82 is selectively dug down by, for example, reactive ion etching to form concave portion 34UG. As a result, the predetermined-shaped plasmon generator 34 having the base 341 and the projection 342 is completed.

Figure 14:
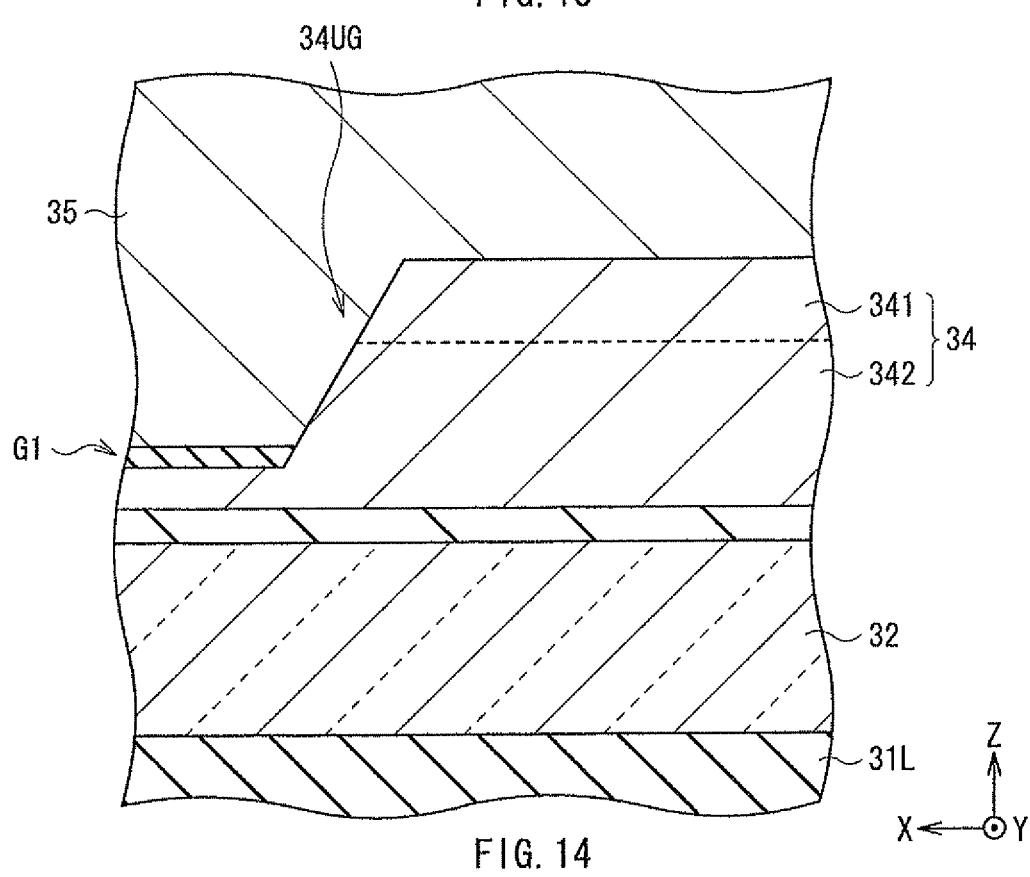
FIG. 14 is a sectional view for explaining a process following the process of FIG. 13.

Next, as illustrated in FIG. 14, after the etching mask 82 is removed, a gap G1 is formed to cover the bottom surface of the concave portion 34UG. Further, the magnetic pole 35 is formed to fill the concave portion 34UG and to cover the upper surface of the base 341. At the time of forming the magnetic pole 35, for example, a plating base film (not illustrated) is formed to cover the gap G1 and the plasmon generator 34 by using, for example, sputtering or IBD method. Then, by plating with use of the plating base film, a plating film is formed to cover the entire surface. After that, the plating film is patterned to form the magnetic pole 35 which includes the predetermined-shaped first portion 351 and the predetermined-shaped second portion 352. Finally, the cladding 17 is formed by, for example, sputtering. In this way, the main part of the magnetic read write head section 10 is completed.

5. Effects of Magnetic Read Write Head and Magnetic Disk Unit

In the embodiment, the near-field light NF is generated with use of the TE wave from the light source unit 50. Therefore, compared with the case of using a TM wave, for example, high output exceeding 100 mW is easily and stably obtainable. Specifically, the laser light 45 as the TE wave is allowed to propagate through inside of the waveguide 32, and the cross-section of the tip portion 342A of the plasmon generator 34 is made quadrangular. Therefore, near the tip portion of the magnetic pole 35, the near-field light NF with high energy density and a small spot size is allowed to be stably generated. As a result, magnetic recording with higher density is more efficiently and stably performed. In addition, in the plasmon generator 34, heat generation occurs near the tip portion 34G due to the generation of the near-field light NF, and the heat propagates from the projection 342 to the plate-like base 341 and then is efficiently output to the outside. As a result, it is possible to suppress excessive temperature rise of the plasmon generator 34, and to avoid unnecessary projection of the tip portion 34G and significant deterioration of the light use efficiency in the plasmon generator 34. Moreover, in the embodiment, on and near the ABS 11S, the first portion 351 of the magnetic pole 35 and the tip portion 342 of the plasmon generator 34 are separated from each other by providing the gap G1. Accordingly, a region in which the energy density of the near-field light NF is high is allowed to be shifted to a position closer to the magnetic pole 35. As a result, magnetic recording with higher density is allowed to be more efficiently and stably performed.

6. First Modification

Figure 15:
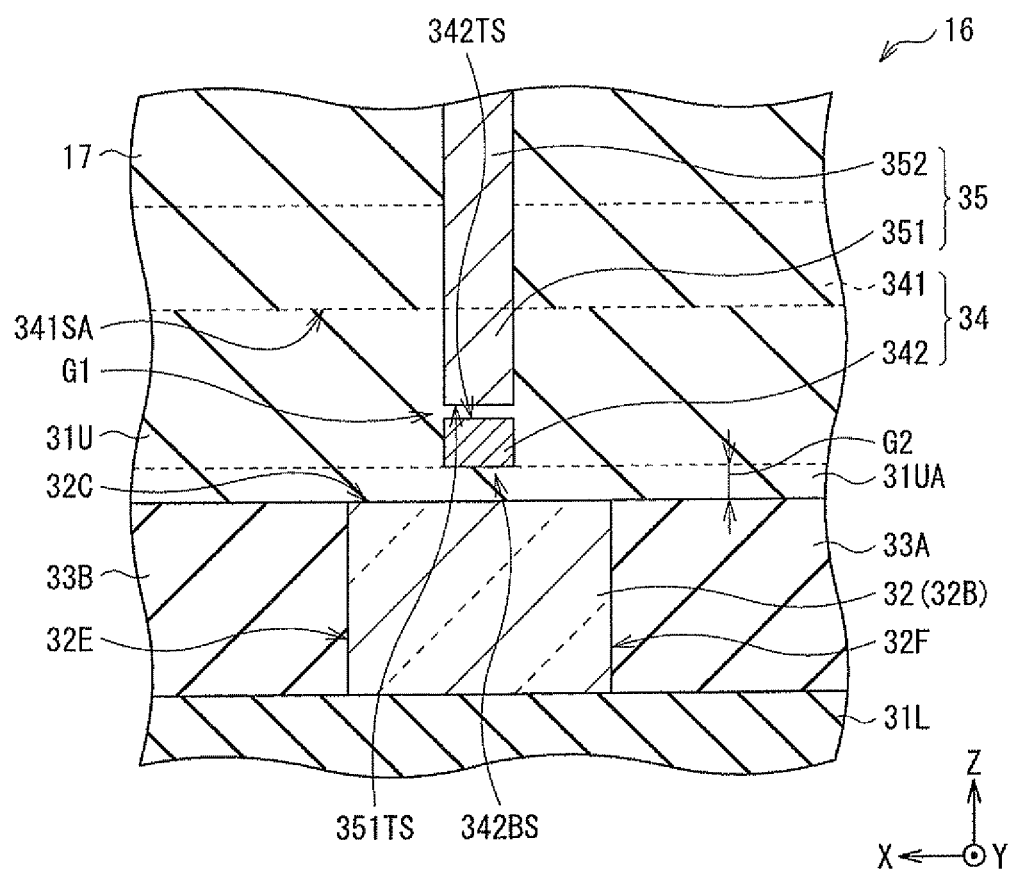
FIG. 15 is a sectional view illustrating a main part of a write head section as a first modification.

FIG. 15 is a sectional view illustrating a configuration of a write head section 16 of the magnetic read write head section 10 as a first modification of the embodiment, and corresponds to FIG. 5. In the above-described embodiment, the first portion 351 of the magnetic pole 35 has a trapezoidal cross-section. However, in the modification, the first portion 351 has a rectangular cross-section. In other words, the width of the magnetic pole 35 in the X-axis direction is substantially constant. In this case, the spot size of the near-field light NF is allowed to be made small, which is advantageous to high density recording. Note that in the modification, the width of the lower surface 351TS and that of the upper surface 342TS are desirably substantially equal to each other.

7. Second Modification

Figure 16:
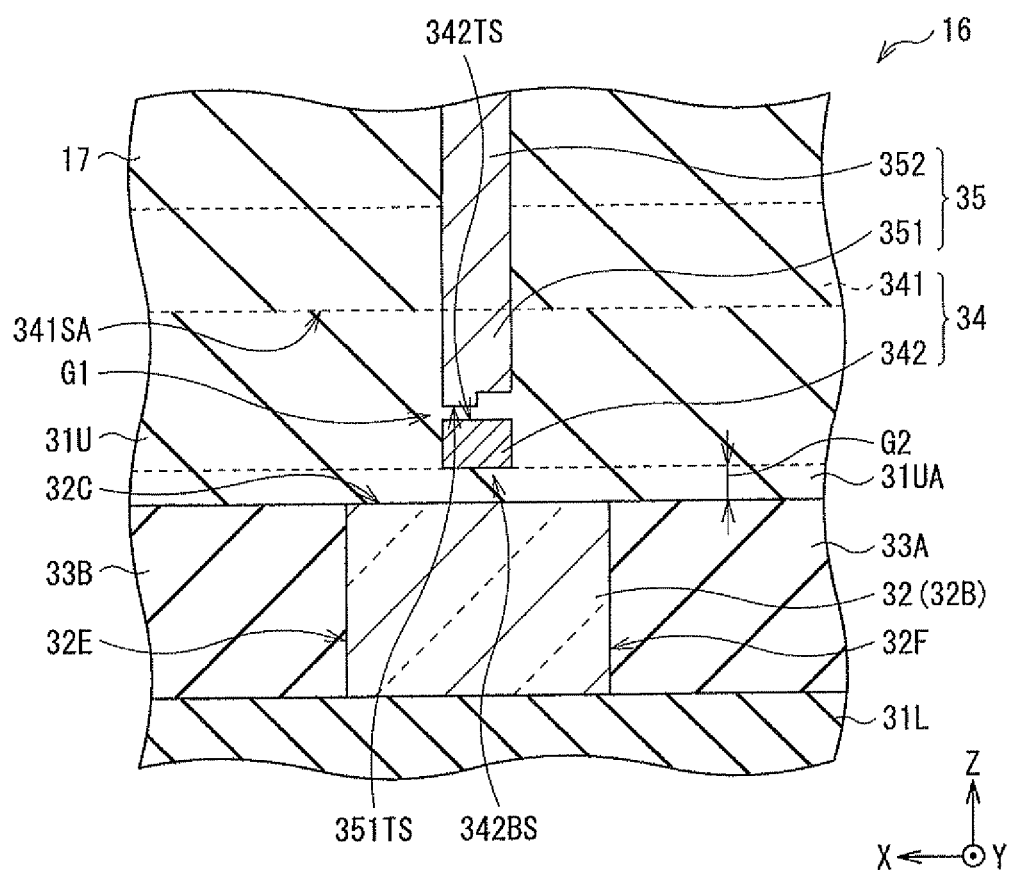
FIG. 16 is a sectional view illustrating a main part of a write head section as a second modification.

FIG. 16 is a sectional view illustrating a configuration of a write head section 16 of the magnetic read write head section 10 as a second modification of the embodiment, and corresponds to FIG. 5. In the above-described embodiment and the above-described first modification, the lower surface 351TS of the first portion 351 of the magnetic pole 35 is flat. In contrast, in the second modification, the lower surface 351TS has a step in the X-axis direction. In other words, the first portion 351 has an asymmetrical shape in a cross-section parallel to the ABS 11S, in the X-axis direction. With the asymmetrical shape, an energy density distribution of the near-field light NF is allowed to be appropriately changed depending on the intended use.

8. Third Modification

Figure 17:
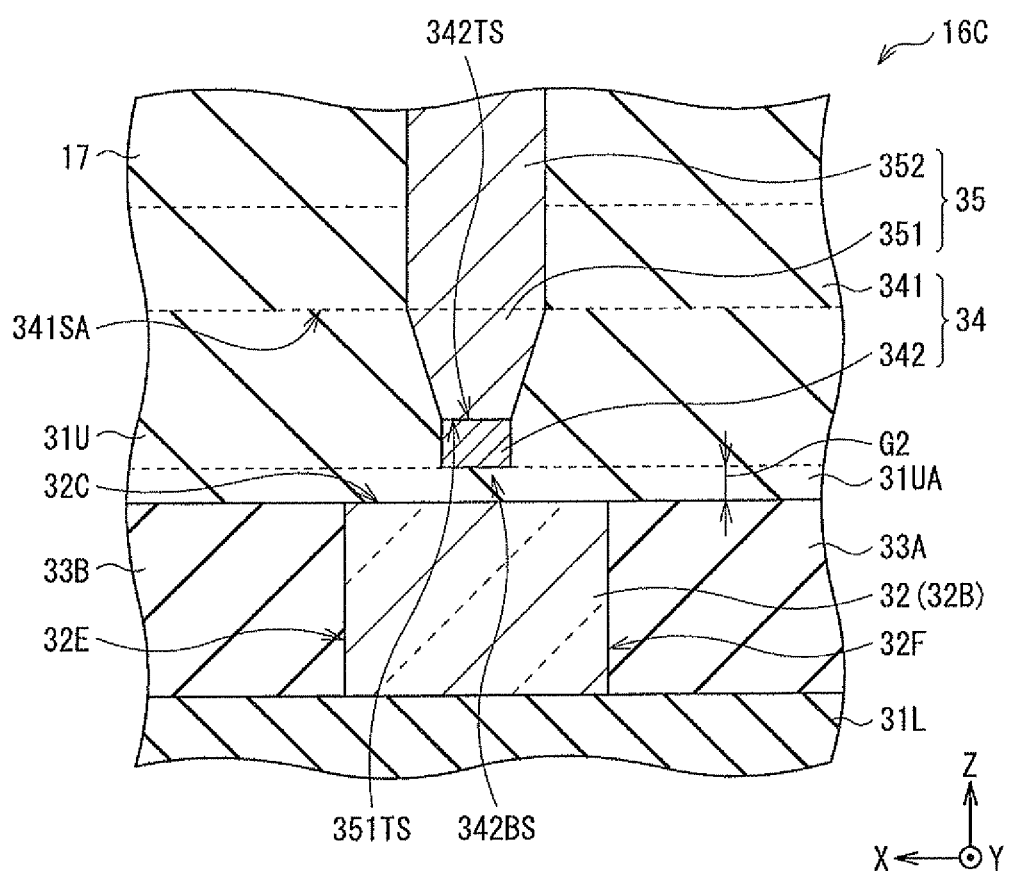
FIG. 17 is a sectional view illustrating a main part of a write head section as a third modification.

FIG. 17 is a sectional view illustrating a configuration of a write head section 16C of the magnetic read write head section 10 as a third modification of the embodiment, and corresponds to FIG. 5. In the above-described embodiment, the first portion 351 of the magnetic pole 35 is separated from the tip portion 342A of the plasmon generator 34. In the third modification, the first portion 351 of the magnetic pole 35 is in contact with the tip portion 342A of the plasmon generator 34. In other words, the lower surface 351TS and the upper surface 342TS are in contact with each other without a gap. In this case, it is advantageous to simplify the manufacturing process.

EXAMPLES

Examples of the invention will be described in detail.

Examples 1-1 to 1-4 and 2-1 to 2-9

Figure 18:
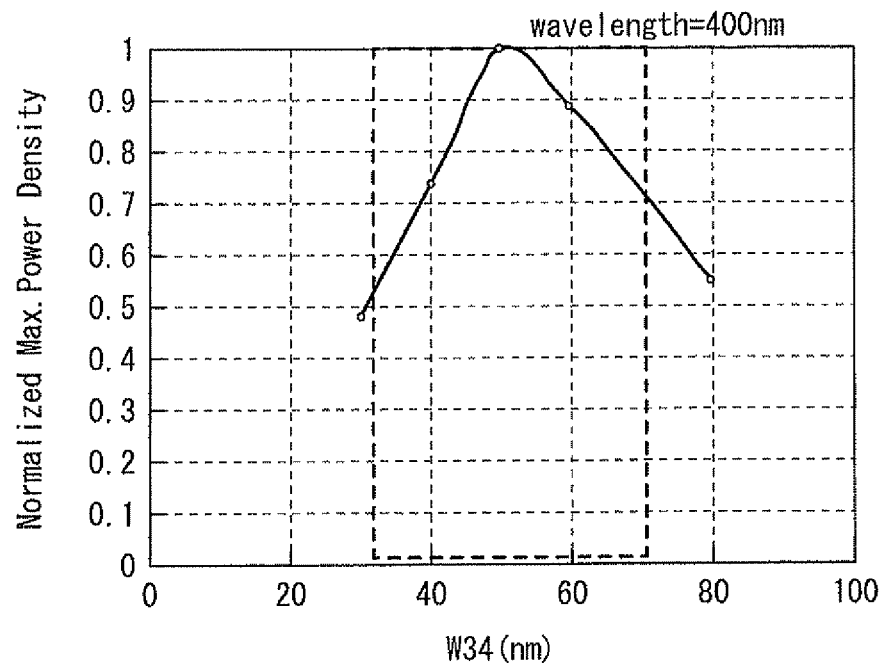
FIG. 18 is a characteristic diagram illustrating a relationship between a width of a plasmon generator and obtained energy density of near-field light in Examples 1-1 to 1-4.
Figure 19:
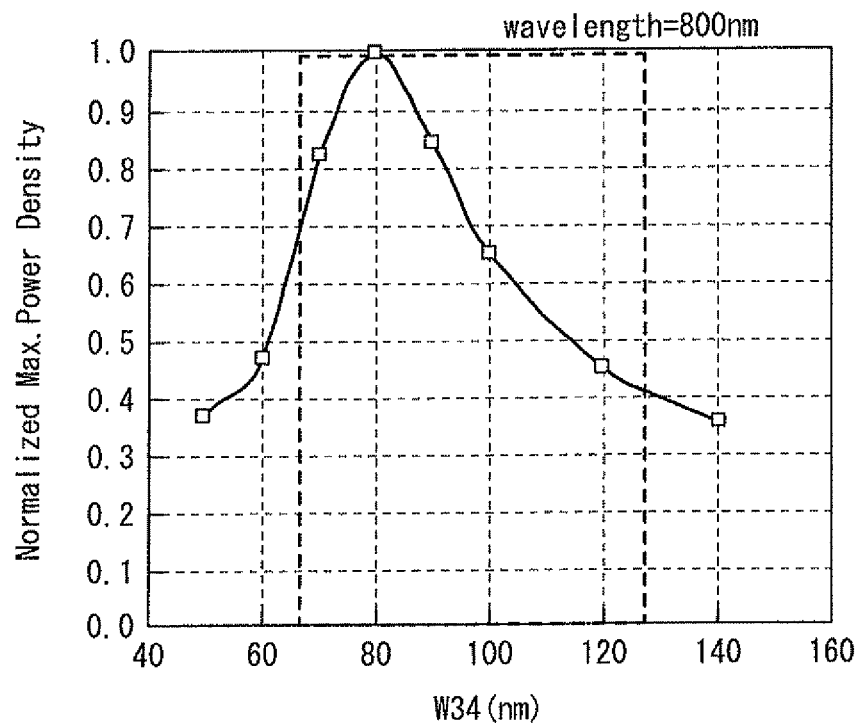
FIG. 19 is a characteristic diagram illustrating a relationship between a width of a plasmon generator and obtained energy density of near-field light in Examples 2-1 to 2-8.

As for the write head section 16A as the above-described first modification of the embodiment, a relationship between the obtained energy density of the near-field light NF and the width (nm) of the tip portion 342A in the X-axis direction was calculated by simulation. The results are illustrated in FIG. 18 and FIG. 19 as well as Table 1 and Table 2.

TABLE 1

| Table 1 | Wavelength (nm) | Width W34 (nm) | Polarization Direction | Light Intensity | Durability |
|---|---|---|---|---|---|
| Example 1-1 | 400 | 30 | TE | 0.49 | Good |
| Example 1-2 | 400 | 40 | TE | 0.74 | Good |
| Example 1-3 | 400 | 50 | TE | 1 | Good |
| Example 1-4 | 400 | 60 | TE | 0.9 | Good |
| Example 1-5 | 400 | 80 | TE | 0.55 | Good |

TABLE 2

| Table 2 | Wavelength (nm) | Width W34 (nm) | Polarization Direction | Light Intensity | Durability |
|---|---|---|---|---|---|
| Example 2-1 | 800 | 50 | TE | 0.38 | Good |
| Example 2-2 | 800 | 60 | TE | 0.48 | Good |
| Example 2-3 | 800 | 70 | TE | 0.82 | Good |
| Example 2-4 | 800 | 80 | TE | 1 | Good |
| Example 2-5 | 800 | 90 | TE | 0.85 | Good |
| Example 2-6 | 800 | 100 | TE | 0.65 | Good |
| Example 2-7 | 800 | 120 | TE | 0.45 | Good |
| Example 2-8 | 800 | 140 | TE | 0.36 | Good |
| Example 2-9 | 800 | 80 | TM | 0.04 | Bad |

FIG. 18 and Table 1 correspond to the case where the TE wave with the wavelength of 400 nm was used as the laser light 45, and FIG. 19 and Table 2 correspond to the case where the TE wave with the wavelength of 800 nm was used as the laser light 45. In FIG. 18 and FIG. 19, the horizontal axis indicates a width W34 (nm) of the tip portion 342A, and the vertical axis indicates an energy density of the near-field light NF. Incidentally, values of the energy density (light intensity) of the near-field light NF in FIG. 18 and Table 1 were normalized with a maximum value (a value when the width W32 was equal to 50 nm) at the time of using the TE wave with the wavelength of 400 nm as 1. Likewise, values of the energy density (light intensity) of the near-field light NF in FIG. 19 and Table 2 were normalized with a maximum value (a value when the width W32 was equal to 80 nm) at the time of using the TE wave with the wavelength of 800 nm as 1. In this case, the constituent material of the plasmon generator 34 was Al in the case where the wavelength was 400 nm, and was Au in the case where the wavelength was 800 nm. In addition, the gap G2 between the plasmon generator 34 and the waveguide 32 was 15 nm, the length L of the plasmon generator 34 in the Y-axis direction was 1.8 μm, the thickness of the tip portion 342A was 30 nm, the length of the tip portion 342A in the Y-axis direction was 0.2 μm, the gap G1 between the first portion 351 and the tip portion 342A was 25 nm, the width of the waveguide 32 in the X-axis direction was 0.6 μm, and the thickness of the waveguide 32 in the Z-axis direction was 0.4 μm. As illustrated by broken lines in FIG. 18 and FIG. 19, it was found that higher energy density is obtainable when the wavelength of the laser light 45 is within a range of about 8 to about 18%. Incidentally, when the width W34 was 80 nm, the energy density in the case where the TE wave was used as the laser light 45 was 1, whereas the energy density in the case where the TM polarization light was used as the laser light 45 was 0.04 (Example 2-9). Accordingly, it was confirmed that the configuration in the invention is suitable for the case of employing the TE wave.

Examples 3-1 to 3-3

Figure 20A:
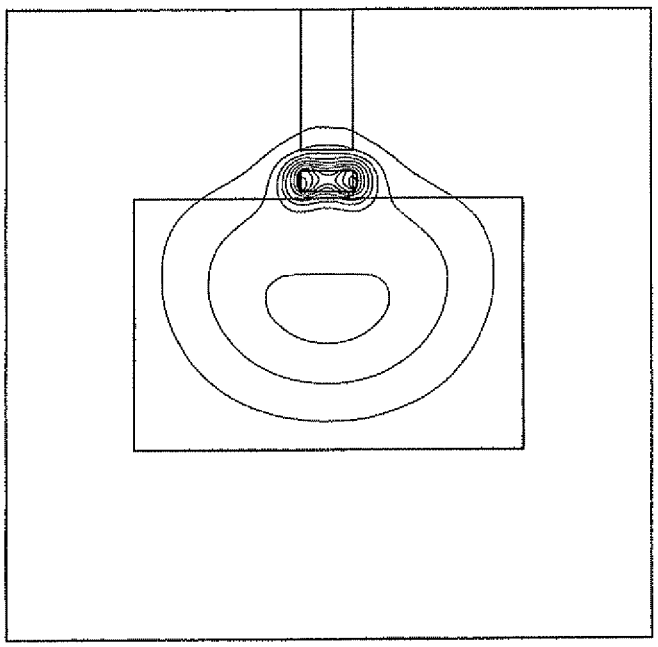
FIG. 20A is a characteristic diagram illustrating a light density distribution of near-field light in Example 3-1.

As for the write head section 16A (Example 3-1) as the above-described first modification of the embodiment and the write head section 16B (Example 3-2) as the above-described second modification of the embodiment, an energy density distribution of the near-field light generated near the tip portion 34G was calculated by simulation. The results are illustrated in FIG. 20A (Example 2-1) and FIG. 20B (Example 2-2). Example 3-1 corresponds to Example 2-4. In addition, in Example 3-2, the step of the lower surface 351TS of the magnetic pole 35 was 10 nm. Moreover, as a comparative example, as for the write head section 16A as the first modification, an energy density distribution of the near-field light NF in the case where the TM polarization was used, was calculated by simulation (Example 3-3). The results are illustrated in FIG. 21.

Figure 20B:
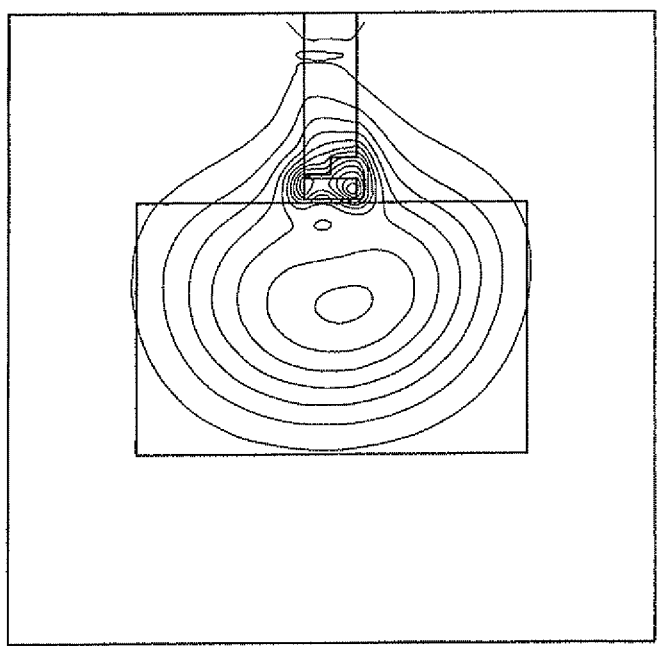
FIG. 20B is a characteristic diagram illustrating a light density distribution of near-field light in Example 3-2.
Figure 21:
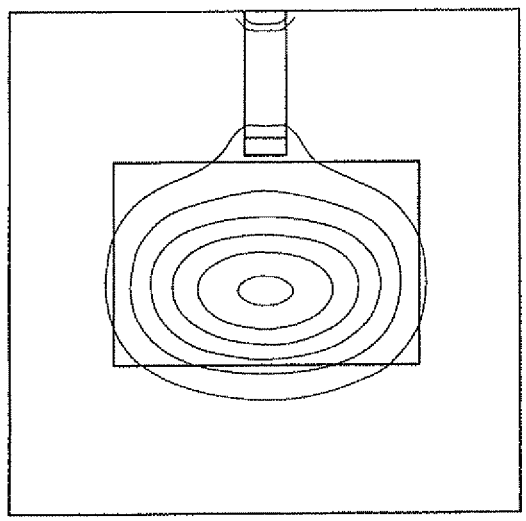
FIG. 21 is a characteristic diagram illustrating a light density distribution of near-field light in Example 3-3.

As illustrated in FIG. 20A and FIG. 20B, Examples 3-1 and 3-2 each had the energy density distribution in which the energy density is higher and rapider near the tip portion 34G of the projection 342 than that of its surrounding portions. On the other hand, in Example 3-3 (FIG. 21), light density changed relatively moderately, and a peak of the energy density was located near the center of the waveguide 32. Accordingly, it was confirmed that the thermally-assisted magnetic recording head of the invention is suitable for forming, near the magnetic pole 35, near-field light NF with high energy density and a smaller spot size.

Hereinbefore, although the invention has been described with referring to the embodiment, the invention is not limited thereto, and various modifications may be made. For example, in the embodiment, although exemplified is a CPP-type GMR element as a read element, the read element is not limited thereto and may be a CIP (current in plane)—GMR element. In such a case, an insulating layer needs to be provided between an MR element and a lower shield layer, and between the MR element and an upper shield layer, and a pair of leads for supplying a sense current to the MR element needs to be inserted into the insulating layer. Alternatively, a TMR (tunneling magnetoresistance) element with a tunnel junction film may be used as a read element.

In addition, in the thermally-assisted magnetic recording head according to the invention, the configurations (shapes, positional relationships, and the like) of the waveguide, the plasmon generator, the magnetic pole, and the like are not limited to those described in the above-described embodiment, and any thermally-assisted magnetic recording head having other configuration may be available.

The correspondence relationship between the reference numerals and the components of the above-described embodiment is collectively illustrated here.

1 . . . housing, 2 . . . magnetic disk, 3 . . . head arm assembly (HAA), 4 . . . head gimbals assembly (HGA), 4A . . . magnetic head device, 4B . . . suspension, 5 . . . arm, 6 . . . driver, 7 . . . fixed shaft, 8 . . . bearing, 9 . . . spindle motor, 10 . . . magnetic read write head section, 11 . . . slider, 11A . . . element forming surface, 11B . . . back surface, 11S . . . air bearing surface (ABS), 12 . . . element forming layer, 13 . . . insulating layer, 14 . . . read head section, 16, 70 . . . write head section, 17 . . . cladding, 21 . . . lower shield layer, 22 . . . MR element, 23 . . . upper shield layer, 24, 25, 27, 38, 39, 42 . . . insulating layer, 26 . . . intermediate shield layer, 28 . . . lower yoke layer, 29 . . . leading shield, 30, 36, 37 . . . connecting layer, 31L, 31U, 33A, 33B . . . cladding, 32, 73 . . . waveguide, 34 . . . plasmon generator, 341 . . . base, 342 . . . projection, 342A . . . tip portion, 342B . . . rear portion, 34G . . . tip portion, 35 . . . magnetic pole, 351 . . .

first portion, 352 . . . second portion, 40A, 40B . . . connecting section, 41 . . . coil, 43 . . . upper yoke layer, 45 . . . laser light, 46 . . . evanescent light, 47 . . . surface plasmon, 48, 49 . . . edge plasmon, 50 . . . light source unit, 51 . . . supporting member, 51A . . . bonding surface, 51B . . . side surface, 51C . . . light source mounting surface, 60 . . . laser diode, 61 . . . lower electrode, 62 . . . active layer, 63 . . . upper electrode, 64 . . . reflective layer, 65 . . . n-type semiconductor layer, 66 . . . p-type semiconductor layer, 72 . . . metal layer, NF . . . near-field light, G1, G2 . . . gap.

What is claimed is:

1. A thermally-assisted magnetic recording head, comprising:
    a magnetic pole;
    a waveguide allowing a transverse-electric wave oscillating in a cross-track direction to propagate toward an air bearing surface; and
    a plasmon generator having a tip portion near the air bearing surface, the tip portion being provided to overlap, in a down-track direction, with both the magnetic pole and the waveguide and having a quadrangular cross-section substantially parallel to the air bearing surface.

2. The thermally-assisted magnetic recording head according to claim 1, further comprising a laser light source emitting the transverse-electric wave toward the waveguide.

3. The thermally-assisted magnetic recording head according to claim 1, wherein the tip portion of the plasmon generator is provided, in the down-track direction, between the magnetic pole and the waveguide.

4. The thermally-assisted magnetic recording head according to claim 1, wherein the waveguide has a size that is larger in the cross-track direction than in the down-track direction.

5. The thermally-assisted magnetic recording head according to claim 1, wherein each of the plasmon generator and the magnetic pole includes an end surface exposed on the air bearing surface, and
    the end surface of the plasmon generator and the end surface of the magnetic pole are adjacent to and separated away from each other in the air bearing surface.

6. The thermally-assisted magnetic recording head according to claim 1, wherein each of the plasmon generator and the magnetic pole includes an end surface exposed on the air bearing surface, and
    the end surface of the plasmon generator and the end surface of the magnetic pole are adjacent to and in contact with each other in the air bearing surface.

7. The thermally-assisted magnetic recording head according to claim 1, wherein the plasmon generator includes:
    a base extending along the waveguide; and
    a projection provided to stand on the base and to include the tip portion between the magnetic pole and the waveguide.

8. The thermally-assisted magnetic recording head according to claim 1, wherein the magnetic pole includes an opposed portion opposed to the tip portion, the opposed portion having an asymmetric shape in the cross-track direction.

9. The thermally-assisted magnetic recording head according to claim 1, wherein
    the tip portion of the plasmon generator and the magnetic pole include respective opposed portions opposed to each other, and
    the opposed portions have respective widths equal to each other in the cross-track direction.

10. The thermally-assisted magnetic recording head according to claim 9, wherein the magnetic pole includes a portion whose width in the cross-track direction increases with increasing distance from the tip portion of the plasmon generator.

11. The thermally-assisted magnetic recording head according to claim 1, wherein the transverse-electric wave has a wavelength in a range from about 400 nm to about 800 nm.

12. A head gimbals assembly, comprising:
    a magnetic head slider having a side surface, the side surface including the thermally-assisted magnetic recording head according to claim 1; and
    a suspension having an end, the end being attached with the magnetic head slider.

13. A head arm assembly, comprising:
    a magnetic head slider having a side surface, the side surface including the thermally-assisted magnetic recording head according to claim 1;
    a suspension having a first end and a second end, the first end being attached with the magnetic head slider; and
    an arm supporting the suspension at the second end thereof.

14. A magnetic disk unit including a magnetic recording medium and a head arm assembly, the head arm assembly comprising:
    a magnetic head slider having a side surface, the side surface including the thermally-assisted magnetic recording head according to claim 1;
    a suspension having a first end and a second end, the first end being attached with the magnetic head slider; and
    an arm supporting the suspension at the second end thereof.

* * * * *